(12) United States Patent
Nigam et al.

(10) Patent No.: US 8,111,481 B2
(45) Date of Patent: Feb. 7, 2012

(54) HIGH CAPACITY DISK DRIVE USING THIN FOIL DISKS AT ELEVATED ROTATIONAL SPEEDS

(75) Inventors: Anil Nigam, Saratoga, CA (US); James White, Knoxville, TN (US)

(73) Assignee: Antek Peripherals, Inc., Saratoga, CA (US)

( * ) Notice: Subject to any disclaimer, the term of this patent is extended or adjusted under 35 U.S.C. 154(b) by 278 days.

(21) Appl. No.: 12/608,223

(22) Filed: Oct. 29, 2009

(65) Prior Publication Data

US 2010/0110589 A1 May 6, 2010

Related U.S. Application Data

(60) Provisional application No. 61/111,611, filed on Nov. 5, 2008.

(51) Int. Cl.
*G11B 23/00* (2006.01)
(52) U.S. Cl. .................................................. 360/135
(58) Field of Classification Search .................. 360/135, 360/133
See application file for complete search history.

(56) References Cited

U.S. PATENT DOCUMENTS

| | | | | |
|---|---|---|---|---|
| 3,967,320 A | * | 6/1976 | Fell | 360/224 |
| 4,396,965 A | * | 8/1983 | DeMoss | 360/224 |
| 5,140,480 A | * | 8/1992 | DeMoss | 360/224 |

FOREIGN PATENT DOCUMENTS

| | | |
|---|---|---|
| JP | S52-60604 | 5/1977 |
| JP | S57-20921 A | 2/1982 |
| JP | S59-96530 A | 6/1984 |
| JP | S59-186123 A | 10/1984 |

* cited by examiner

*Primary Examiner* — Angel A. Castro
(74) *Attorney, Agent, or Firm* — Kilpatrick Townsend & Stockton, LLP

(57) ABSTRACT

A data storage device uses a foil disk platter with significantly reduced inertia and weight as compared to the thick aluminum or glass disk platter in a typical hard disk drive. The reduced rotating inertia of the foil disk enables faster spin-up performance which can be used to reduce decrease the power consumed by the unit. In portable appliances that use disk drive storage devices battery life can be extended significantly and the unit can be made thinner and lighter. Certain parameters of the foil disk substrate may be determined, to provide improved control of disk flutter, from a range parameter defined by $$\text{RANGE} = \frac{\rho R^2}{E t^2}$$

where $\rho$=foil disk substrate mass density,
R=foil disk substrate radius,
E=Young's modulus of foil disk substrate, and
t=foil disk substrate thickness.
RANGE has dimensional units of $s^2/in^2$, and the magnitude of RANGE may be between $10^{-6}$ and $3(10^{-4})$.

25 Claims, 7 Drawing Sheets

HIGH CAPACITY DISK DRIVE USING THIN FOIL DISKS AT ELEVATED ROTATIONAL SPEEDS

This application claims the benefit of U.S. Provisional Application Ser. No. 61/111,611 filed on Nov. 5, 2008, which is hereby expressly incorporated by reference in its entirety for all purposes.

CROSS-REFERENCES TO RELATED APPLICATIONS

The disclosures of co-pending U.S. patent application Ser. No. 11/843,482, titled "Multi-Platter Flexible Media Disk Drive Arrangement" and related PCT international application PCT/US2007/076908 are hereby incorporated herein in their entirety for all purposes.

BACKGROUND OF THE INVENTION

The hard disk drive (HDD) is the predominant data storage mechanism that is used in servers, desktop and notebook computers, and consumer appliances today. In the HDD the recording medium consists of a rigid disk (HD) made from an aluminum or a glass substrate that is about 95 mm to 48 mm in diameter with a thickness in the range of about 1.27 mm for the 95 mm disk to about 0.5 mm for the smaller 48 mm disk. The architecture of the HDD consists of at least one HD and a recording head configured to operate on at least one face of this disk. The recording head flies over the disk surface supported by a very thin pressurized air film which develops when the disk spins at a high rpm. The recording head is mounted to an arm and driven by an electro-magnetic actuator arrangement to move over the disk platter at a fast speed. High data storage capacity on each disk is achieved by recording a large number of data tracks per disk surface along with a large number of data bits per track. The technology of the magnetic film deposited on the disk and the geometry of the recording transducer attached to each head and the associated manufacturing processes are improving at a very rapid rate, allowing many more bits of information to be recorded per square inch on the disk surface. In an effort to increase the storage capacity of each disk drive additional disk platters and recording heads are utilized. A 3.5 inch form factor disk drive can have four aluminum disk platters that are 1.27 mm thick and eight recording heads and is available in a product that is about 26 mm tall. Such a drive consumes considerable amounts of power in order to go from a stopped condition to operating speeds of 5400 rpm to 7200 rpm due to the large inertia of the hard disks. To keep motor current within reasonable limits, spin-up times can be as large as 6 to 10 seconds. Certain 3.5 inch form factor disk drives use a smaller diameter disk and operate at 15,000 rpm consuming even more power and taking more time to come to operating speed. These large spin-up delays result in 3.5 inch HDDs operating continuously in server farms consuming power in order to provide fast assess to data. Attempts to increase disk operating speed beyond 15,000 rpm have to date been unsuccessful due to poor reliability.

Smaller form factor HDDs such as the popular 2.5 inch and the 1.8 inch use one to three glass disk platters in each unit. They are installed in portable PCs and consumer appliances where the power source is a battery pack. These units consume more power than semiconductor Flash memory. However, the cost of Flash memory is 5 to 10 times larger per unit of stored data, making the HDD the more economical choice.

Description of Prior Art

U.S. Pat. No. 5,968,627 teaches a method of fabricating a flexible recording medium using a metal foil substrate while U.S. Pat. No. 5,675,452 teaches a method of designing a fixed media disk drive where the recording medium is a floppy disk.

BRIEF SUMMARY OF THE INVENTION

In one embodiment, a data storage device comprises a housing, a motor having a rotatable spindle, and at least one foil disk non-removably mounted to the spindle to rotate therewith. Certain foil disk substrate parameters may be determined from a range parameter defined by $$\text{RANGE} = \frac{\rho R^2}{E t^2}$$

where $\rho$=foil disk substrate mass density,
R=foil disk substrate radius,
E=Young's modulus of foil disk substrate, and
t=foil disk substrate thickness.
RANGE has dimensional units of $s^2/in^2$, and in order to provide for improved control of disk flutter and disk out-of-flatness, the magnitude of RANGE may be between $10^{-6}$ and $3(10^{-4})$.

DETAILED DESCRIPTION OF THE INVENTION

This disclosure teaches a method to reduce the rotating inertia of a typical HDD by a significant amount enabling faster spin-up performance to reduce the power consumed by a disk drive by as much as 5 times. In portable appliances either battery life can be extended significantly or smaller and lighter packs can be employed.

Figure 1:
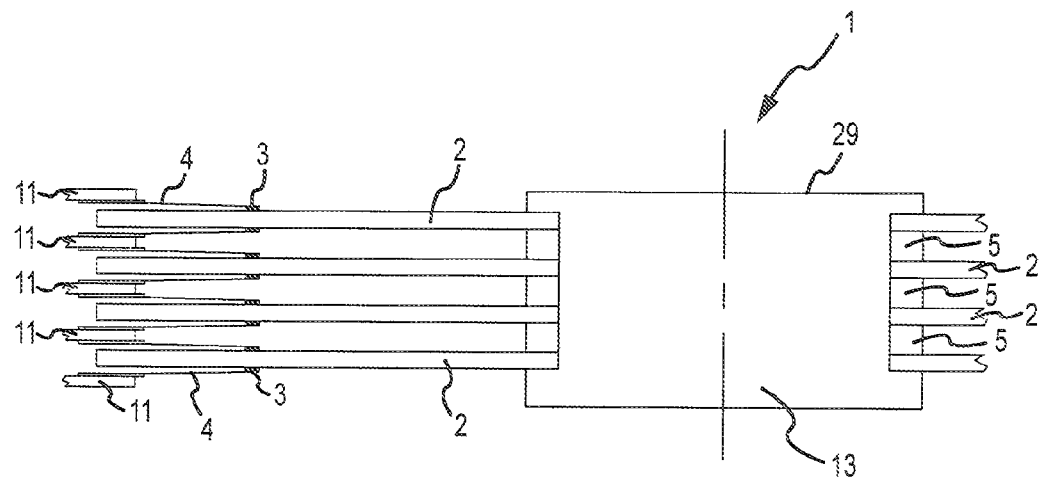
FIG. 1 illustrates a recording head and disk platter arrangement in a four platter HDD.

FIG. 1 shows the disk pack and recording head arrangement in a prior art HDD unit 1. Thick aluminum or glass disk platters 2 are coated with a thin magnetic recording film. These platters are rotated by a spindle motor 13 to high speeds of about 7200 rpm in a 3.5 inch form factor disk drive product. The rotational inertia of a typical four platter, 3.5 inch form factor HDD with aluminum disk platters 2 that are 1.27 mm thick and spaced apart by aluminum spacers 5 that are about 2.3 mm thick, is about $1.106 \times 10^{-4}$ kg-m². Using a 12 volt power supply this product takes about 6 seconds to go from a stopped condition to operating at 7200 rpm. Each disk platter 2 is polished to a very smooth finish and is made flat to reduce out-of-plane velocity and acceleration perturbations. Recording heads 3 are mounted to a suspension system 4 and arranged on disk platters 2. Suspension 4 is attached to an aluminum arm 11. The suspension system 4 generates a force of about 2 to 4 grams pushing heads 3 towards disk 2. A surface contour, also referred to as the air bearing contour, is developed on the face of each recording head 3 that faces disk 2. This air bearing contour creates a pressure to support head 3 in a non-contact condition over the surface of disk 2, when disk 2 rotates at high speeds. The flatness and smoothness of disk 2 allows the spacing between head 3 and the disk surface to be very small to achieve high recording density. The current state of the art is about 1090 Kbits per inch recorded along the circumference of disk 2 and about 150,000 tracks per inch in the radial direction.

Figure 2:
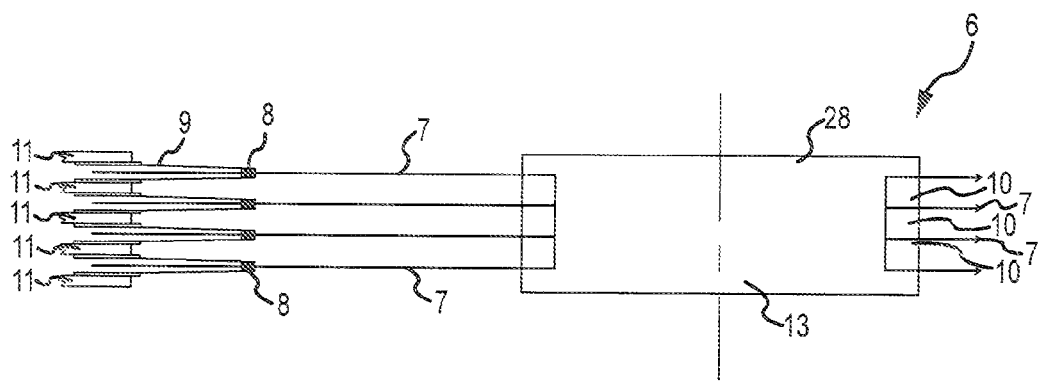
FIG. 2 illustrates a Foil Drive arrangement with four metal foil platters and recording heads, in accordance with embodiments of the invention.

FIG. 2 illustrates a Foil Drive arrangement in accordance with embodiments of the invention. A Foil Drive 6 utilizes thin disk platters 7 fabricated from 50 micron thick austenitic steel sheets and spaced apart by aluminum spacers 10. Heads 8 are supported by a suspension system 9. Suspension 9 is attached to aluminum arms 11 and generates a force urging head 8 toward disk 7. Heads 8 can be similar to the heads in the HDD 1 or these heads can have a different air bearing contour such as described in U.S. patent application Ser. Nos. 11/748,417 and 60/909,567, the disclosures of which are hereby incorporated herein by reference for all purposes.

One possible configuration could consist of disks 7 being separated similar to the HDD arrangement described above by spacers 10 that are 2.3 mm thick. The use of thinner disks 7 would result in the disk drive becoming slimmer by about 4.9 mm. Alternate arrangements could consist of thinner spacers 10 that are about 1.83 mm thick and the disk drive will be slimmer by about 6.3 mm.

Using foil disks 7 it is possible to realize 3.5 inch, 2.5 inch or 1.8 inch or other form factor disk drives with more disks 7 arranged in the same product height as the HDD but with larger data storage capacity or a slimmer product with the same number of disk platters and recording heads offering a similar data storage capacity. Additionally, a 41.6 micron thick 3.5 inch metal foil disk has about the same rotating inertia as a 0.635 mm thick 2.5 inch glass hard disk. Thus, it is possible to use the spindle motor and the other electro-mechanical hardware from a 9.5 mm height 2.5 inch disk drive and create a 2 platter 3.5 inch disk drive that is 9.5 mm tall. Furthermore, since a 3.5 inch disk drive installation has both +12 volt and +5 volt supplies available the 2.5 inch electro-mechanical hardware can operate at greater rotational speeds and achieve faster data accessing performance.

Another benefit of Foil Drive 6 is the inertia of the disk pack. Using 2.3 mm thick aluminum spacers 10 the rotating pack inertia is about 8 times lower than that of the HDD described above, at $1.38 \times 10^{-5}$ kg-m². This unit can go from a stopped condition to 7200 rpm using the same power supply and spindle motor in about 1 second. Using thinner spacers 10 spin-up time can be made even smaller. Additionally, the disk stack with foil disks 7 can be rotated at a faster rpm by reducing the number of turns in the spindle motor coils to enable disk speeds of greater than 10,000 rpm in this specific product, and with further optimization of spindle motor parameters speeds in excess of 20,000 rpm can be achieved.

Fast start-up operation of the Foil Drive can allow it to be kept in "sleep mode" where only the interface is active and the spindle motor is stopped reducing power consumption by more than 5 times. Additionally, in products that are configured with heads 8 and disk 7 that start and stop in contact with the disk surface, the faster acceleration of foil disk 7 can minimize the time of contact between head 8 and the surface of disk 7 improving product reliability.

If a Foil Drive is stopped for long periods of time environmental conditions could be different from the time it was operational last, resulting in the need for a time consuming recalibration process to tune the disk drive servo control system. However, using the fast startup performance of the Foil Drive the drive could be spun-up at certain specified intervals to update the servo table and not burden each spin-up operation with this large recalibration time period.

A 50 micron thick metal foil may not be as flat as a 1.27 mm thick disk with its larger bending rigidity. In an as rolled condition the foil could be out of flat by as much as 0.005 inch per inch of linear dimension. This flatness can be improved using a stress relieving operation where the foil is heat treated when it is constrained between two very flat and parallel surfaces. Such a procedure will create a zero stress condition in the material, when it is in the flat state. In addition the foil can be stretched bi-axially to a little beyond yield to eliminate waviness in the material for improved flatness. Other processes such as a smooth hard surface being pushed into the plane of the metal foil while it is in tension can be used to reduce small wavelength waviness in the material.

A 95 mm diameter disk 7 for example, when installed in a disk drive will be constrained at its inner diameter, and when the disk is stationary it may droop at the outer diameter due to its own weight by as much as 0.3 mm. Foil flatness and droop conditions can result in out-of-plane velocity and acceleration perturbations on heads 8. In a preferred embodiment thickness of metal foil 7 and the rotational speed can be selected to allow centrifugal forces to flatten disk 7 and create a surface suitable to support very low, non-contact operation between head 8 and the surface of disk 7 to enable high density recording.

Disk 2 spins in an enclosed environment creating air flows with speeds that are dependent on the RPM level. These air flows may become turbulent and vortices could be shed from the surfaces of drive components such as the recording heads, supporting arms and other mechanics installed inside this enclosure, contributing to an unsteadiness of motion. These unsteady air flows and the pressure fluctuations produced can perturb disk 2 creating out-of-plane oscillations and flutter motion which is a common problem faced in the design of the HDD and is usually solved by making disk 2 thicker to provide greater bending rigidity. A different approach, described below, is taken for reducing the oscillations and flutter motion of foil disks used in the Foil Drive.

A non-dimensional ratio of disk centrifugal force to bending force can be expressed as:

$$\text{Ratio} = \frac{\rho V^2 R^2}{Et^2}$$

where ρ=disk mass density
V=disk tangential velocity at the outer radius
R=disk radius
E=disk elastic modulus
t=disk thickness At a fixed value of disk tangential velocity (which corresponds to a fixed rate of digital data transfer), another dimensionless ratio can be expressed that relates the ratio above for a foil disk to that for a hard disk. That ratio appears as:

$$\text{Ratio}_2 = \text{Ratio}_{FD} / \text{Ratio}_{HD}$$

or $$\text{Ratio}_2 = \left(\frac{\rho R^2}{Et^2}\right)_{FD} \left(\frac{Et^2}{\rho R^2}\right)_{HD}$$

where FD=foil disk and HD=hard disk

An optimal selection of foil disk substrate mass density, radius, elastic modulus, and thickness can be made to reduce both high rotational speed disk flutter motion and disk out-of-flatness conditions. In one embodiment, the foil disk is composed of a steel substrate with the following properties:
E=28(10⁶) lbf/in²
ρ=0.29 lbm/in³
t=0.001 in.
while the hard disk comparison has an aluminum substrate of the same diameter (=95 mm) as the foil disk but with the following typical properties:
E=10.3(10⁶) lbf/in²
ρ=0.098 lbm/in³
t=0.050 in.

In this case, Ratio$_2$=2721 which demonstrates that this foil disk has a much higher ratio of centrifugal force to bending force than that of the corresponding hard disk. Our experimental work has shown that the steel foil disk flattens sufficiently and remains stable over a wide range of disk speeds.

In another embodiment, the foil disk substrate is composed of titanium with the following properties:
E=16.8(10⁶) lbf/in²
ρ=0.164 lbm/in³
t=0.002 in.
and the hard disk comparison has a glass substrate with the properties:
E=10.56(10⁶) lbf/in²
ρ=0.0907 lbm/in³
t=0.020 in.
R$_{HD}$=2R$_{FD}$=24 mm For this embodiment, Ratio$_2$=28.4. Compared to the hard disk, this foil disk experiences a full order of magnitude higher ratio of centrifugal force to bending force. These embodiments each demonstrate two desired characteristics. While providing sufficient stiffness to overcome disk flutter motion through influence of a relatively high elastic modulus, these foil disks, due to their reduced thicknesses have increased flexibility and ability to flatten their surfaces through the action of centrifugal forces during high speed rotation. It should be understood that a minimum magnitude of centrifugal force must be present in the foil disk substrate 7. Experiments have shown that disk speeds in excess of 4000 rpm (418.9 rad/s) provide the best results in standard disk size form factors. Most current disk drive products utilize disks whose diameters vary from about 48 mm to 95 mm. The current invention is especially useful in this range of disk diameters. However, the current invention also provides the benefits described earlier with smaller disk sizes, such as one inch, 0.5 inch diameter, and smaller, and should be useful as disk drives become smaller and more portable and mobile. Merely by way example, such disks may have diameters equal to or less than about: 0.875 inch, 0.75 inch, 0.625 inch, 0.375 inch, 0.25 inch, 0.125 inch, 25 millimeters; 24 millimeters, 22 millimeters, 20 millimeters, 18 millimeters, 16 millimeters, 14 millimeters, 12 millimeters, 10 millimeters, 8 millimeters, 6 millimeters, and/or 4 millimeters. The foil disk can be fabricated from a metal and more specifically from metals such as nickel, nickel alloys, cobalt, cobalt alloys, steel, stainless steel, Sandvik steel, chromium, chromium alloys, beryllium, beryllium alloys, copper, copper alloys, brass, bronze, titanium, titanium alloys, aluminum, and aluminum alloys. The foil disk could also be constructed from a sheet of Metglas which has very low magnetic permeability.

Although the manufacturing requirements may be quite different than those for metal foil disks, glass and ceramic materials may also be utilized for the disk substrate of this invention. For example, AF45 borosilicate glass available from Schott Inc., 555 Taxter Road, Elmsford, N.Y. 10523 could be utilized. In another specific embodiment a AF45 glass foil disk substrate has the properties:
E=9.6(10⁶) lbf/in²
ρ=0.098 lbm/in³
t=0.004 in.
and the hard disk comparison is a glass substrate with the following properties:
E=10.56(10⁶) lbf/in²
ρ=0.0907 lbm/in³
t=0.020 in.
R$_{HD}$=R$_{FD}$/2=12.7 mm For this embodiment, Ratio$_2$=118.8 and again demonstrates the much higher ratio of centrifugal force to bending force for the foil disk relative to the hard disk.

After considering the performance of a large number of foil substrates and configurations, an optimal dimensionless range for Ratio$_2$ was determined and is given by:

$$10^1 \leq \text{Ratio}_2 \leq 4(10^4)$$

Within this range, the foil disk experiences an optimal combination of stiffness and flexibility for control of both disk flatness and flutter during high speed rotation. This range for Ratio$_2$ applies equally for metallic, glass and ceramic substrates.

In order to obtain useful design criteria, the hard disk parameters may be removed from the above optimal dimensionless range for Ratio$_2$ to arrive at an optimal dimensional range for the foil disk substrate parameters given by $$10^{-6} \leq \left(\frac{\rho R^2}{Et^2}\right) \leq 3(10^{-4})$$

where the above grouping of terms, $$\frac{\rho R^2}{Et^2},$$

has dimensional units of $[s^2/in^2]$.

This is the relatively narrow critical range of this grouping of terms and relates the high speed foil disk substrate parameters ($\rho$,R,E,t) for an optimal combination of bending and centrifugal forces that will overcome disk flutter and provide the required disk flatness. Furthermore, values of this grouping of terms greater than $3(10^{-4})\ s^2/in^2$ produce a foil disk that lacks required stiffness for optimal performance and values of this grouping of terms less than $10^{-6}\ s^2/in^2$ produce a foil disk that lacks required flexibility for optimal performance. Within this critical range, the disk radius is seen to influence the values of foil disk substrate mass density, elastic modulus and thickness for optimal performance. As an example, a given disk size and foil substrate thickness may, without iteration, result in the critical range above being satisfied for a selected substrate material. However, a different disk radius may result in a violation of the critical range for that same material and thickness. In such a case, the foil substrate material and possibly thickness would then be varied and iterated further if necessary in order to satisfy the critical range.

In a test arrangement, 95 mm diameter, 50 micron thick foil disks were installed in a disk drive housing with a clear plastic top cover similar to the configuration illustrated in FIG. 2. A laser beam was reflected from various points on the upper disk with some points that were close to the location of the topmost recording head. The reflected beam's position will change if the surface of the disk at the reflection point moves vertically or changes angular orientation. The recording heads were positioned at typical inner, middle and outer recording tracks while the spindle motor was cycled from a stopped state to various high rotational speeds. The results show a steady reduction in the movement of the reflected beam indicating that the disk surfaces became stable at the higher rotational speeds. Furthermore, they remain stable even when the recording heads are accessed over the disk surface.

There may be situations that require a further reduction in high speed disk flutter or require another performance enhancement such as very low disk rotational inertia for reduced energy applications. For such situations the design of a structure is proposed to be used in combination with the optimum range of foil disk parameters described above. Co-pending U.S. patent application Ser. No. 11/843,482, titled "Multi-Platter Flexible Media Disk Drive Arrangement" and related PCT international application PCT/US2007/076908, both previously incorporated by reference, teach a plate that is used to stabilize disk 7 prior to loading and unloading heads 8 from a cam structure.

Figure 3:
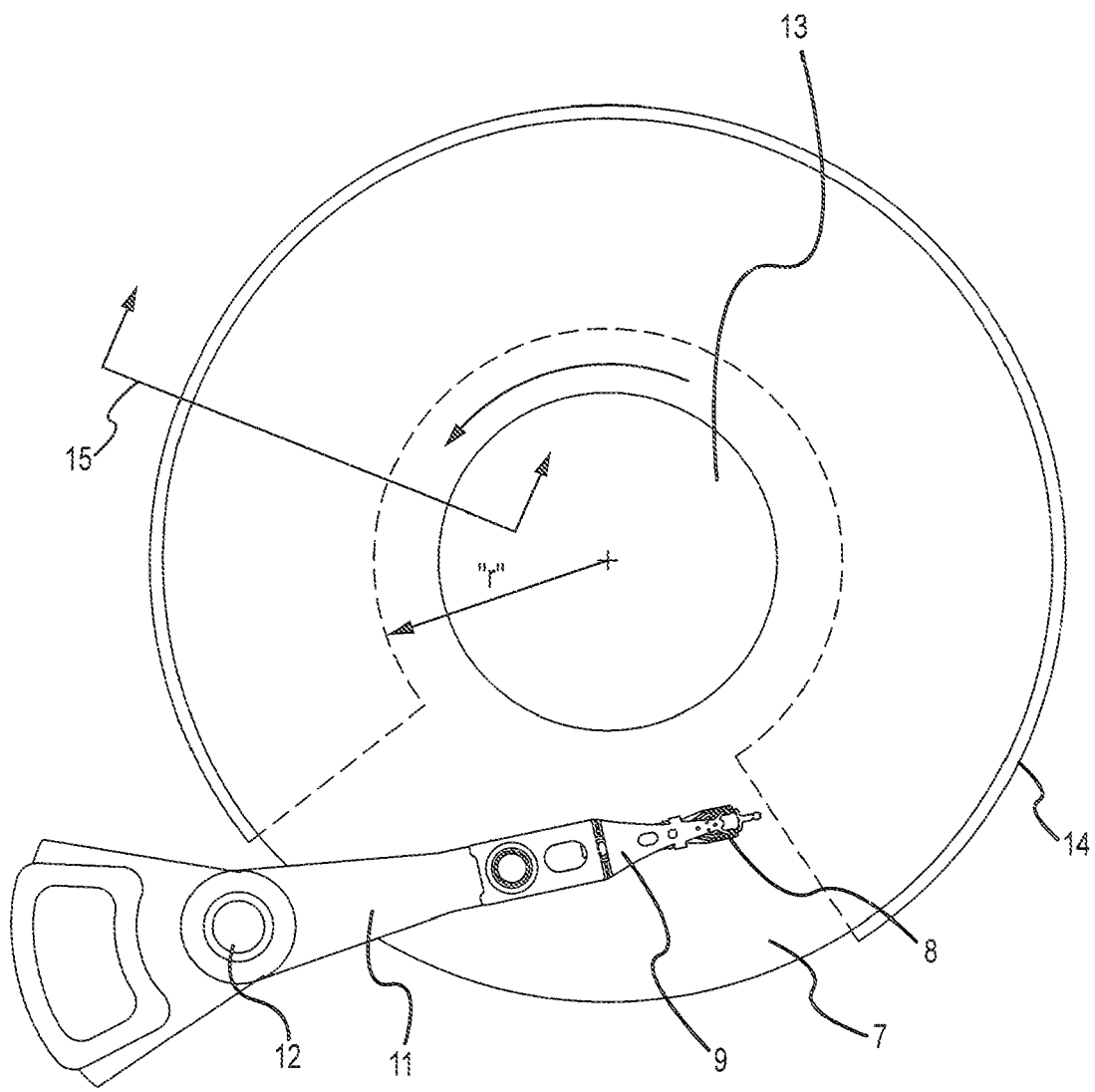
FIG. 3 illustrates a stabilization plate in a Foil Drive, in accordance with embodiments of the invention.
Figure 4:
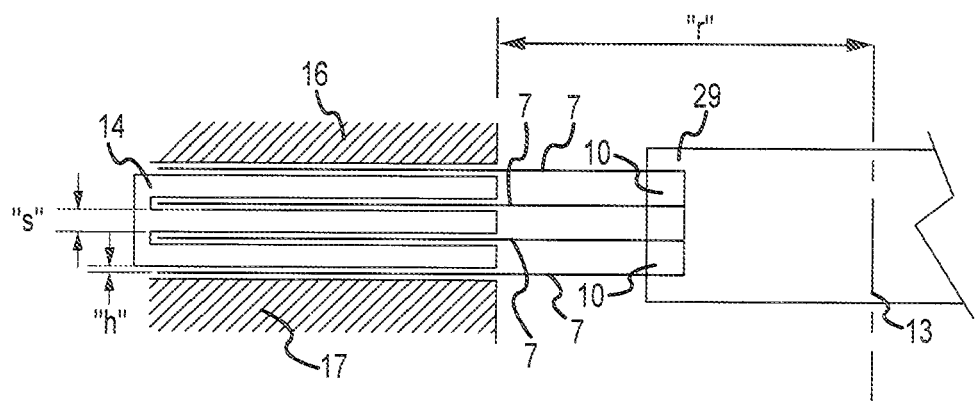
FIG. 4 illustrates a stabilization plate in a multi-disk arrangement, in accordance with embodiments of the invention.

FIG. 3 illustrates a head-disk arrangement in the Foil Drive, in accordance with embodiments of the invention, where disk 7 is rotated by spindle 13 and recording head 8 is attached to arm 11 by suspension 9. Arm 11 is actuated around pivot 12 moving head 8 to various locations on disk 7. A structure 14 is provided starting a little beyond the outer radius of disk 7 and stretching towards the spindle motor up to a radius "r". FIG. 4 shows the details in section 15 of FIG. 3, in accordance with embodiments of the invention, to illustrate components configured along the axis of spindle 13. Structure 14 only covers a portion of the circumference of disk 7 to provide space for arms 11 to access the various data tracks.

Spacing "h" shown in FIG. 4 is selected to keep the air flow within the vicinity of disk 7 laminar. Additionally, the thickness "s" can be selected to provide sufficient rigidity in structure 14. The air velocity gradient developed in thickness "h" can also create a pressure that can influence the position of disk 7. The combination of bending rigidity, centrifugal forces and this pressure gradient can result in the vertical position of foil disk 7 being controlled by plate 14. In the HDD the bending rigidity of the hard disk 2 is so large that the beneficial influence of such pressure gradients is insignificant. In the Foil Drive this pressure gradient can be utilized to eliminate disk flutter and provide a stable disk surface to enable high density recording. Top cover 16 and drive base 17 can perform the same function as plate 14 for the top and bottom foil disks 7 in a multi-platter arrangement, or they can be used in a single platter or in two platter configurations without 1. Spacing "h" and associated tolerances can be selected to achieve the desired performance. The thickness of disk 7 can be selected to provide sufficient rigidity to minimize droop in the un-supported circumference portion. In one preferred embodiment with a 95 mm diameter disk that is 50 micron thick, the value of "r" is about 30 mm, "h" is about 0.5 mm and "s" is about 1.3 mm. The disk spacing for this embodiment was 2.3 mm.

Figure 5:
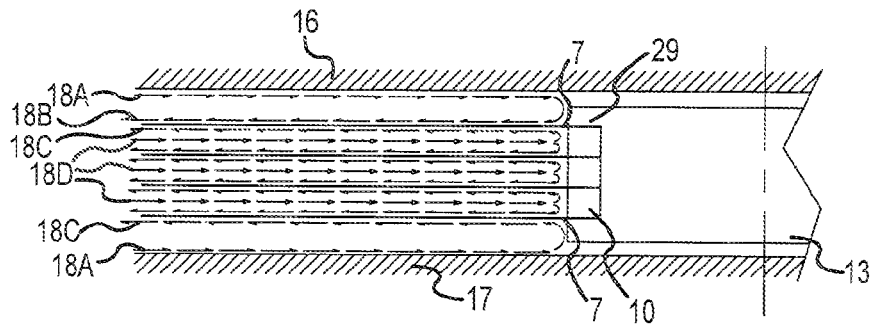
FIG. 5 illustrates air flow in a multi-disk pack, in accordance with embodiments of the invention.
Figure 6:
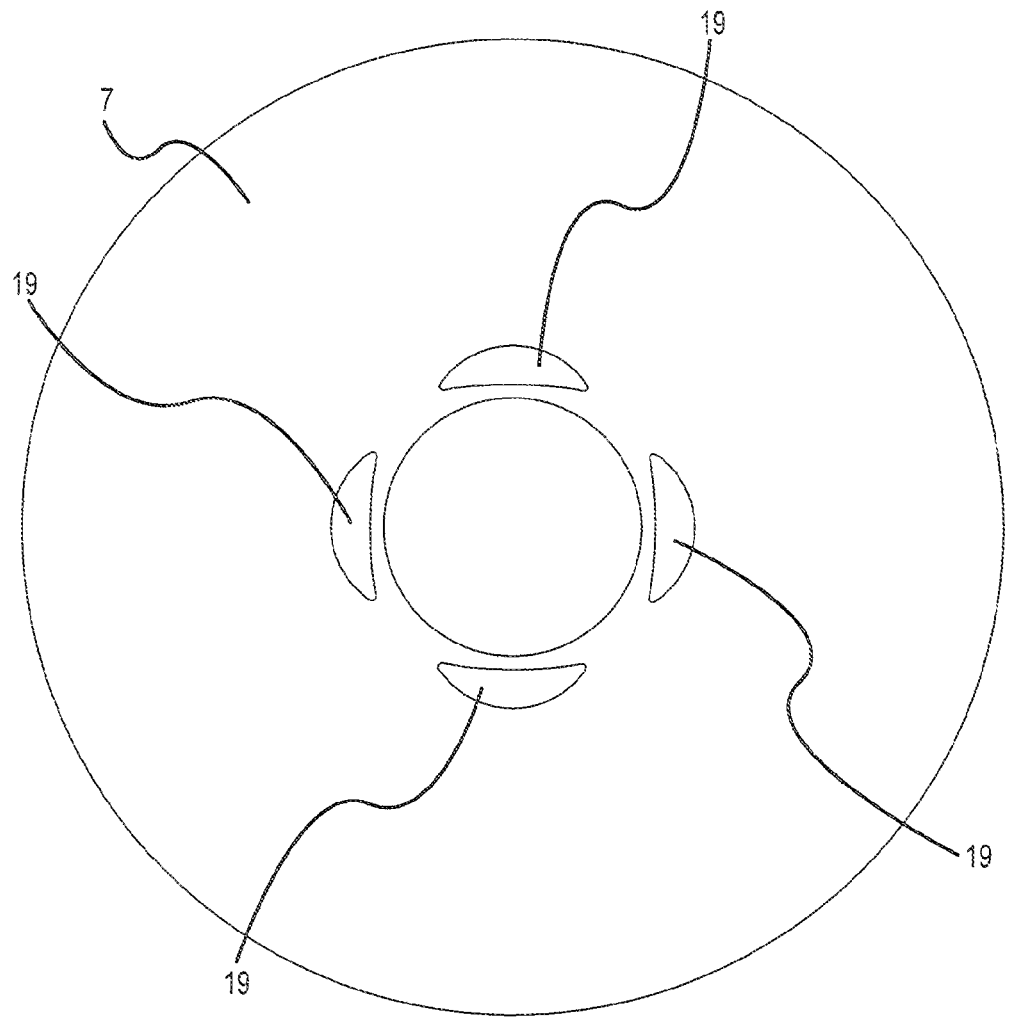
FIG. 6 illustrates disk pressure equalization slots, in accordance with embodiments of the invention.
Figure 11:
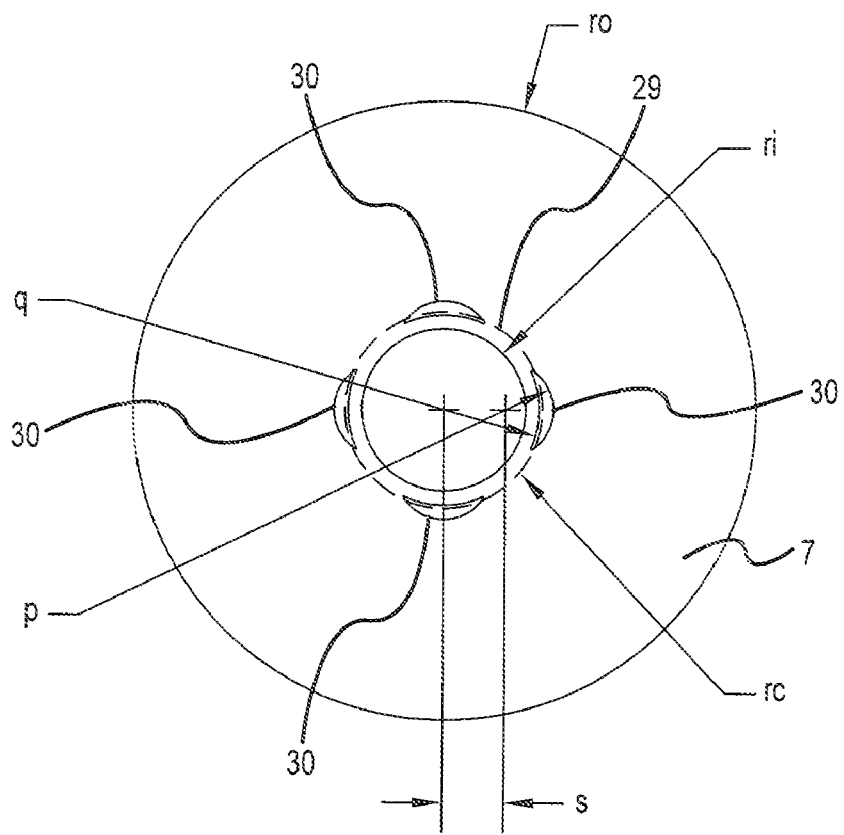
FIG. 11 illustrates pressure equalization slots with disk spacer, in accordance with embodiments of the invention.

FIG. 5 illustrates the well known air flow patterns 18 in a disk pack spinning in an enclosed space, in accordance with embodiments of the invention. Air flow patterns 18A move along the top 16 and bottom 17 surfaces of the enclosure and outwards as 18B along the surface of each disk 7. In the space between two adjacent disks air flows inwards as 18D and then turns around at the inner diameter and flows out as 18C. The air in the middle of two adjacent disks spins at about half the speed as that near the surface of each disk. These air flow patterns require pressure gradients that would be created at the outer and the inner disk diameters, which may differ at each disk location in the disk stack creating out of plane forces to cause individual foil disks 7 to flutter. Rapid seeking motion of the recording heads, arm 11, suspension 9 and heads 8 shown in FIG. 3, could also influence these pressure gradients and result in disk flutter. To overcome these out of plane forces FIG. 6 illustrates slots 19 fabricated around the inner diameter of disk 7, in accordance with embodiments of the invention. A slot in this context defines an opening in the disk with a finite width and some radial extent such that air can flow through this opening. The shape, size and number of slots 19 can be optimized to achieve stable disk operation for the range of disk form factors, disk-to-disk spacing distances and rotational speeds. In one preferred embodiment illustrated in FIG. 11 the metal foil disk 7 has an outer radius "ro" of about 47.5 mm and inner radius "ri" of about 12.5 mm. The disk spacer has an outside radius "rc" of about 15 mm. Four slots are created at the inner diameter separated from each other by 90 degrees. The slots have a radius "p" of about 7.3 mm. This radius is developed about a point that is "s" or about 9.4 mm displaced from the center of the disk. The inner edge of this slot is formed by radius "q" of about 14.6 mm. The vented area for each slot is about 17.2 mm².

In a preferred embodiment of a multi-platter disk pack, slots 19 in all disks 7 can be arranged to be perfectly aligned with each other along spindle axis 13. This arrangement promotes axial flow at the inner diameter and the air flow pattern could be different than those depicted in FIG. 5. In another preferred embodiment slots 19 in the disk stack are arranged to not be aligned with the adjacent disk's slot. In this configuration the pressure gradients at the inner diameter on the top and bottom of each disk 7 can be equalized. Alternate arrangements could consist of slots 19 being aligned between adjacent disks in a variety of overlap positions to achieve other preferred operating conditions.

Figure 7:
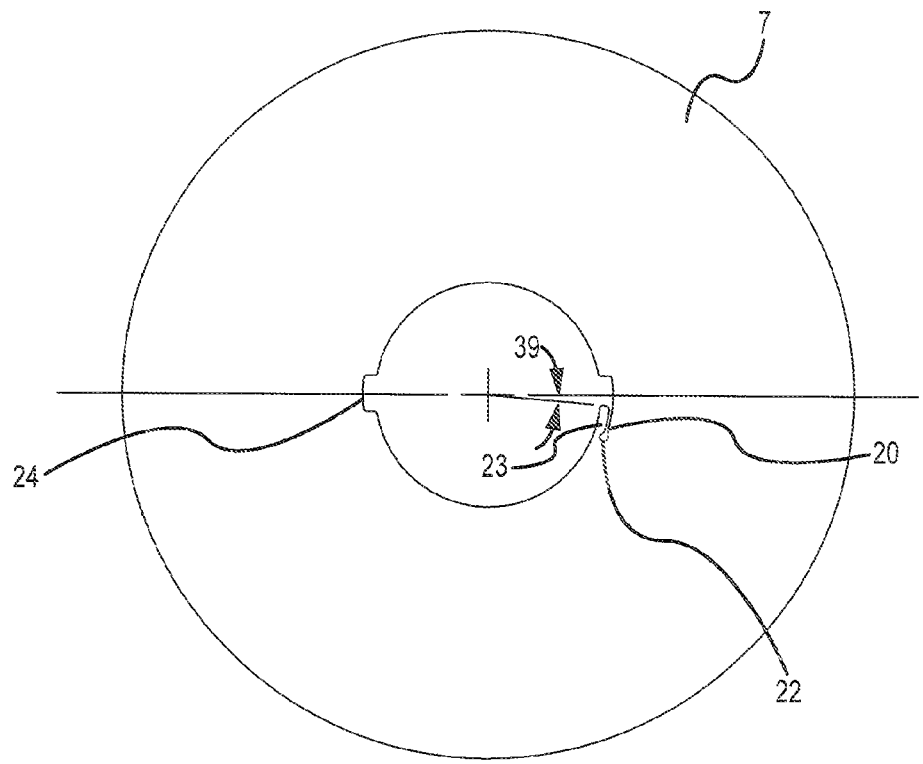
FIG. 7 illustrates a metal foil disk with added features at the inner diameter, in accordance with embodiments of the invention.
Figure 8:
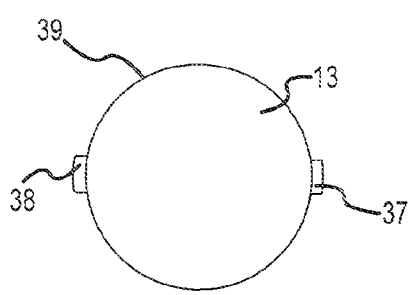
FIG. 8 illustrates a spindle motor hub with two tabs, in accordance with embodiments of the invention.
Figure 9:
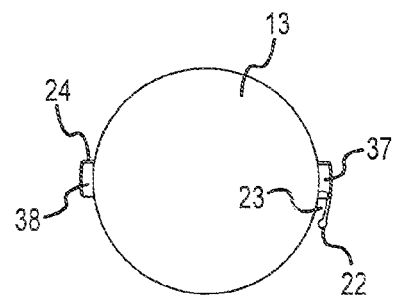
FIG. 9 illustrates details of the disk features of FIG. 7 and a spindle hub engagement, in accordance with embodiments of the invention.
Figure 12:
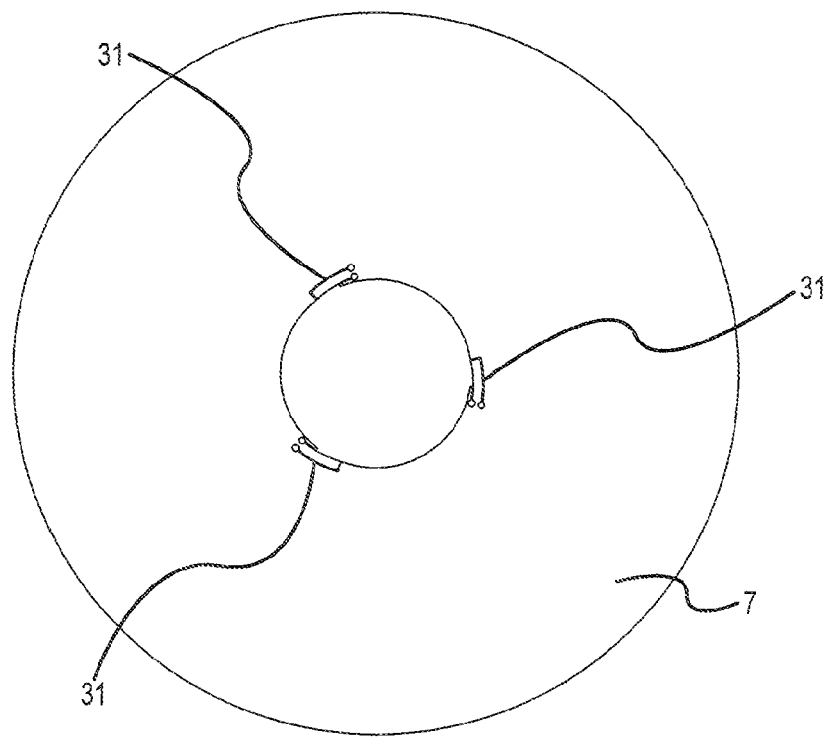
FIG. 12 illustrates a metal foil disk with tangential tabs, in accordance with embodiments of the invention.
Figure 13:
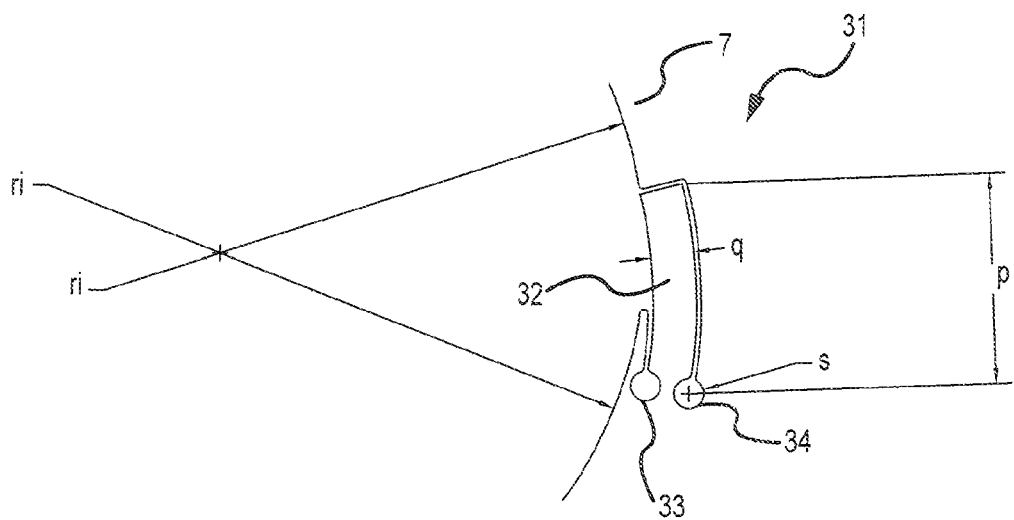
FIG. 13 illustrates details of the metal foil disk tab of FIG. 12, in accordance with embodiments of the invention.
Figure 14:
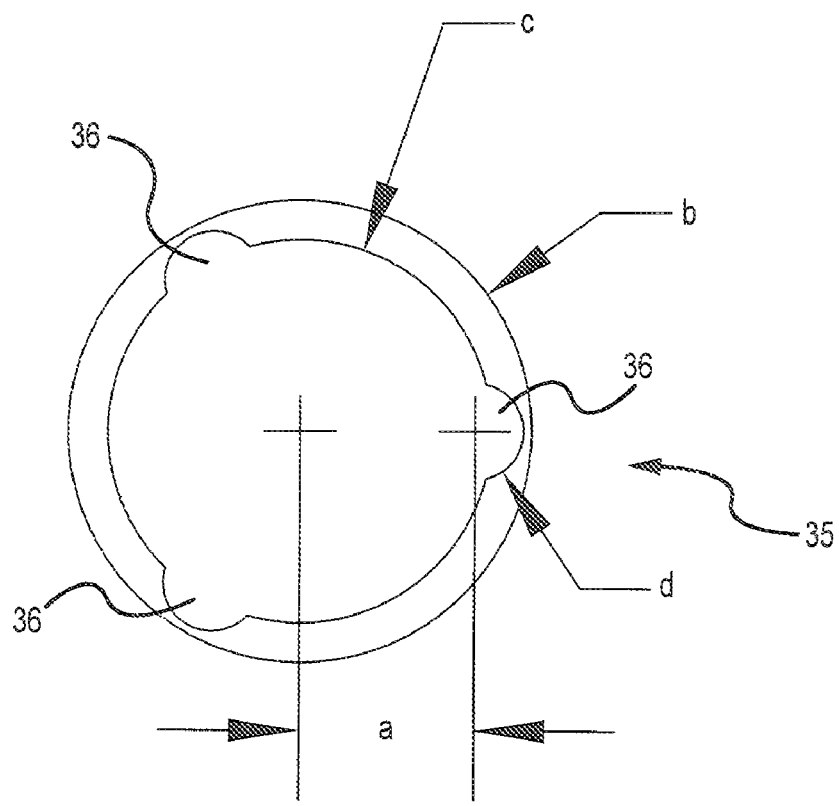
FIG. 14 illustrates details of the disk spacer used with metal foil disk of FIG. 12, in accordance with embodiments of the invention.
Figure 15:
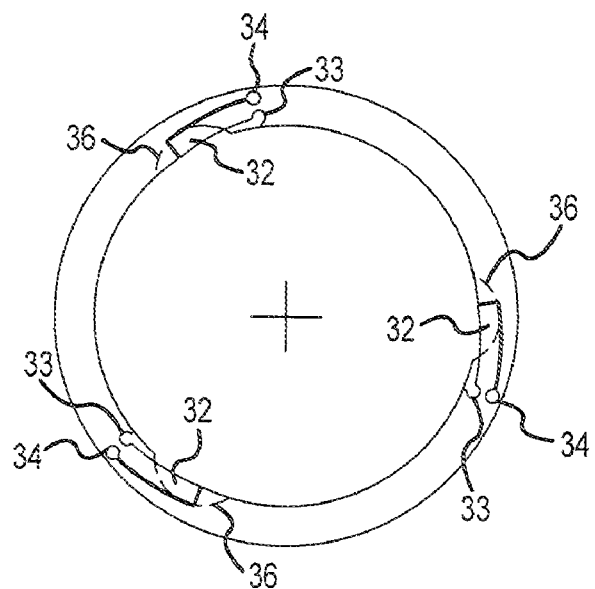
FIG. 15 illustrates disk tabs swaged in disk spacer slots, in accordance with embodiments of the invention.

Hard disk 2 in an HDD is clamped to the spindle motor with a clamp plate 29 which provides sufficient vertical force to keep the disk or disks in a disk stack from moving, vertically, radially and tangentially during transportation, handling, start-stop operation and to meet shock/vibration specifications. The design of this clamp disk and the arrangement of the screws used to develop the necessary vertical force is optimized to prevent the disk from distorting and "potato-chipping" yet generating sufficient force to achieve the desired clamping action. A thin metal foil disk does not have rigidity similar to the thick hard disk to overcome this "potato-chipping" effect if similar clamping forces are utilized; however, the foil disk has a much lower mass and a smaller clamping force could be used. FIG. 7 illustrates a preferred embodiment where features 20 and 24 are formed at the inner diameter of disk 7. FIG. 8 shows the spindle motor hub with two tabs 37 and 38, and FIG. 9 shows the engagement details of the ID features on disk 7 and the spindle motor 13, in accordance with embodiments of the invention. The tab 23 in the metal foil disk is formed such that when the respective edge of 24 contacts the edge of spindle tab 38, tab 23 would overlap spindle tab 37 as shown in FIG. 9. Tab 23 can be swaged to the respective side of 37 such that disk 7 is locked to the spindle motor hub with the cantilever stiffness of tab 23 as it is bent over the side of 37 and the "line to line" contact of 24 and 38. The relief hole 22 in disk 7 eliminates distortion of the foil disk due to the swaging action of 23. A clamp disk similar to the one used in the HDD can be utilized with a very light force to ensure no movement of the foil disk along the axis of the spindle motor. The value of this clamp force can be selected depending on the thickness of the metal foil disk 7 to eliminate "potato-chipping" effects. In one specific embodiment, spindle motor 13 has a diameter of 19.95 mm and features 39 and 38 are located on a diameter of 23.5 mm and are 3 mm wide. The inner diameter of disk 7 is 20 mm and all features of tab 24 are made about 0.3 mm larger than spindle tab 38. The angle 39 is 3 deg. and tab 23 is 0.75 mm wide and 2.5 mm long. Hole 22 is 0.75 mm in diameter. In other embodiments the clamp disk could have a flexural spring arrangement which would develop the desired vertical clamping force without multiple screws. Additionally, the tabs could have different shapes as appropriate for a specific design. In a preferred embodiment illustrated in FIG. 12, three tabs 31 are fabricated at the ID of disk 7. These tabs are oriented in a tangential direction. FIG. 13 shows the details of each tab. Disk 7 is about 95 mm in outer diameter and the inner diameter is about 25 mm, or "ri" is 12.5 mm. Disk spacer 35 is illustrated in FIG. 14, where the diameter "b" is about 30 mm, inner diameter "c" is about 25 mm and three slots that are spaced 120 degree apart are fabricated with a diameter "d" of 6.3 mm for each. A slot in this context refers to a cavity or an opening in the disk spacer ring. This diameter is created about a point "a" that is 10.8 mm from the center of the spacer. The thinnest portion of this slot is about 1.1 mm thick and the thickness of this spacer could be 2.3 mm or 1.8 mm as described about. The detail of each tab is shown in FIG. 13. Tab 32 has two holes 33 and 34 that are about 0.89 mm in diameter. The width of tab 32 is 1.2 mm. Tab 32 is centered between the inner and outer diameter of disk spacer 35 and is rotated by about 5 degrees towards the center of the disk. This allows the edge of tab 32 to be aligned with the inner radius of the spacer 35. The length of this tab "p" is about 6.5 mm. Disk 7 is positioned on spacer 35 and tabs 32 are swaged into the slots 36 as shown in FIG. 15. Holes 33 and 34 keep disk 7 flat without any distortion from this swaging action. Tab 32 will form around the edges of slot 36 in the spacer and will restrain disk 7 from radial or tangential motion. As described earlier vertical motion of disk 7 is restricted by a clamp disk with a very light load.

Figure 10:
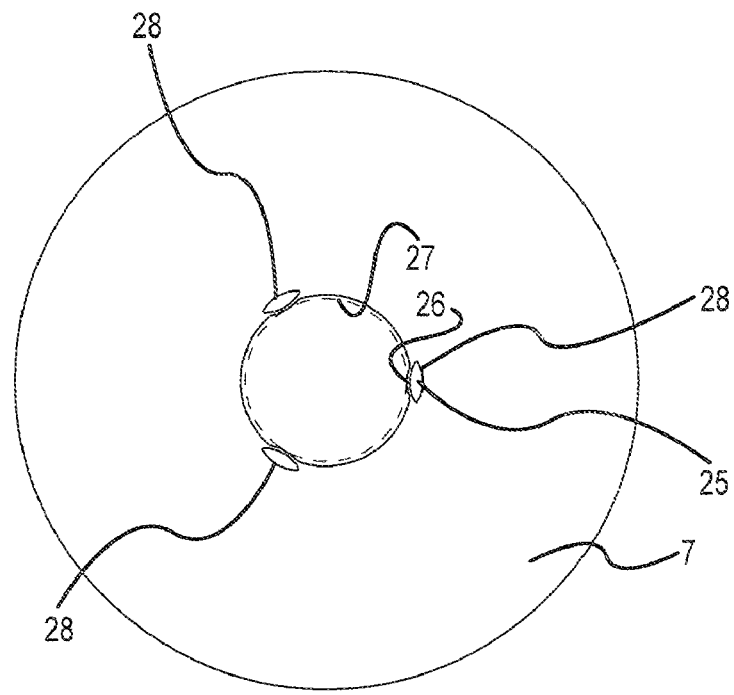
FIG. 10 illustrates a metal foil disk with radial alignment features, in accordance with embodiments of the invention.

In another preferred embodiment illustrated in FIG. 10, foil disk 7 is fabricated with tabs 28 located at the inner diameter. These tabs 28 consist of a slot 25 forming arms 26 which can flex in the radial direction. Disk 7 is pushed over the spindle rotor diameter 27, and arms 26 in each of the tabs 28 act as springs gripping the spindle 27. The stiffness of arms 26 can be designed to meet shipping, handling and environmental shock/vibration specification. Again, the clamp disk from the HDD can be utilized to ensure no disk displacement along the axis of spindle 13 with a very light load, or a spring could be used to develop this force.

The performance provided by this invention is improved when the recording head sliders utilize very little preload. For reference, preload is a mechanical spring force applied to the slider toward the disk that contributes to support of the slider in close nominally non-contact proximity to the disk during full speed rotation. The preload also secures the slider is in contact against the disk during non-operable transport for those HDDs that do not mechanically lift the slider away from the disk surface before disk rotation is stopped. The use of a very small preload force appears to be ideal for application of opposed sliders with a high speed foil disk since the net normal air bearing force acting on the disk is made very small, even when considering manufacturing tolerance effects on the opposing sliders. This serves to reduce disk deflection and the instabilities that can result during high speed rotation. Due to the flexibility of the foil disk, opposing recording head sliders interact through their air bearings, unlike the operation of opposing sliders on a hard disk. In order to control both the static and dynamic interaction of opposing sliders, the advantages of this invention are best observed when at least one of the opposing sliders is of the vacuum cavity type. The vacuum cavity type slider produces a higher air bearing stiffness than a slider without a vacuum cavity. This allows the vacuum cavity slider to provide increased stability to the slider-disk interface. For situations where only a single side of the disk is used for recording and where no opposing slider or load bearing apparatus is used to stabilize the disk, use of a vacuum cavity slider with very small preload force is essential in order to provide a stable slider-disk interface.

Stable operation of the slider-foil disk interface is best provided by use of very small recording head sliders, such as the industry standard Pico (1.25 mm×1.00 mm) and Femto sized (0.85 mm×0.70 mm) or smaller sliders. In addition to being able to function with very little preload force, very small sliders can produce especially low viscous drag forces on the footprint of the slider-disk interface. This enhances stability of the slider-disk interface and reduces power consumption. The benefits of this invention are best obtained when a slider flying over the foil disk surface presents a face (footprint) toward the disk that occupies no more than 1% of the disk surface area. In addition, the benefits of this invention are increased when the slider preload force is less than two grams. However, partial benefits are also obtained when the preload force is in the range from two grams to four grams.

The invention has now been described in detail for the purposes of clarity and understanding. However, those skilled in the art will appreciate that certain changes and modifications may be practiced within the scope of the appended claims.

What is claimed is:

1. A data storage device comprising;
a housing;
a motor having a rotatable spindle;
at least one foil disk non-removably mounted to the spindle to rotate therewith;
wherein certain foil disk substrate parameters are determined from a range parameter defined by $$\text{RANGE} = \frac{\rho R^2}{Et^2}$$

where $\rho$=foil disk substrate mass density,
R=foil disk substrate radius,
E=Young's modulus of foil disk substrate, and
t=foil disk substrate thickness;
wherein said RANGE has dimensional units of $s^2/in^2$;
and wherein in order to provide for improved control of disk flutter and disk out-of-flatness, the magnitude of RANGE is between $10^{-6}$ and $3(10^{-4})$.

2. A data storage device as in claim 1, wherein the substrate of the foil disk is constructed from metal.

3. A data storage device as in claim 1, wherein the foil disk substrate is constructed from one in the group of materials consisting of nickel, nickel alloys, and metglas.

4. A data storage device as in claim 1, wherein the foil disk substrate is constructed from one in the group of materials consisting of chromium, chromium alloys, cobalt, cobalt alloys, and Havar.

5. A data storage device as in claim 1, wherein the foil disk substrate is constructed from one in the group of materials consisting of steel, stainless steel, austenitic steel, Biodur and Sandvik steel.

6. A data storage device as in claim 1, wherein the foil disk substrate is constructed from one in the group of materials consisting of titanium, and titanium alloys.

7. A data storage device as in claim 1, wherein the foil disk substrate is constructed from one in the group of materials consisting of aluminum, and aluminum alloys.

8. A data storage device as in claim 1, wherein the foil disk substrate is constructed from one in the group of materials consisting of copper, copper alloys, brass, bronze, beryllium, and beryllium alloys.

9. A data storage device as in claim 1, wherein the substrate of said foil disk is constructed from glass or ceramics.

10. A data storage device as in claim 1, wherein the spindle motor rotates the said foil disk at a speed greater than 4000 rpm.

11. A data storage device as in claim 1, wherein the said foil disk has at least one surface coated with a magnetic film.

12. A data storage device as in claim 11, wherein at least one recording head slider is mounted in said storage device and is configured to transfer information to and from the magnetic film.

13. A data storage device as in claim 12, wherein the applied load to said recording head slider is less than or equal 2 grams.

14. A data storage device as in claim 12, wherein the applied load to said recording head slider is between 2 grams and 4 grams.

15. A data storage device as in claim 1, wherein the said foil disk has a magnetic film deposited on both sides of the said foil disk.

16. A data storage device as in claim 15, wherein a first recording head slider is arranged on a first side of the said foil disk and a second recording head slider is arranged on a second side of the said foil disk substantially opposing the first recording head slider.

17. A data storage device as in claim 1, wherein the said foil disk has at least one slot at an inner diameter in the vicinity of the attachment of the foil disk to the spindle;
wherein said slot can influence air pressure levels on either side of the said foil disk as it rotates.

18. A data storage device comprising;
a housing;
a motor having a rotatable spindle;
two foil disks non-removably mounted to the spindle and separated from each other along the axis of the spindle and disposed to rotate therewith;
wherein a first foil disk has at least two slots at an inner diameter in the vicinity of the attachment of the first foil disk to the spindle;
wherein at least one slot in the first foil disk has a radial width and extends outwards from the inner diameter;
wherein the second foil disk has at least two slots at an inner diameter in the vicinity of the attachment of the second foil disk to the spindle;
wherein at least one slot in the second foil disk has a radial width and extends outwards from the inner diameter;
and wherein at least one slot in the first foil disk is substantially aligned with a slot in the second foil disk;
wherein certain foil disk substrate parameters are determined from a range parameter defined by $$\text{RANGE} = \frac{\rho R^2}{Et^2}$$

where $\rho$=foil disk substrate mass density,
R=foil disk substrate radius,
E=Young's modulus of foil disk substrate, and
t=foil disk substrate thickness;
wherein said RANGE has dimensional units of $s^2/in^2$;
and wherein in order to provide for improved control of disk flutter and disk out-of-flatness, the magnitude of RANGE is between $10^{-6}$ and $3(10^{-4})$.

19. A data storage device as in claim 18, wherein a first recording head slider is arranged on a first side of the first foil disk, and a second recording head slider is arranged on a second side of the first foil disk substantially opposing the first recording head slider.

20. A data storage device as in claim 19, wherein a third recording head slider is arranged on a first side of the second foil disk.

21. A data storage device as in claim 20, wherein a fourth recording head slider is arranged on a second side of the second foil disk substantially opposing the third recording head slider.

22. A data storage device comprising;
a housing;
a motor having a rotatable spindle;
two foil disks non-removably mounted to the spindle and separated from each other along the axis of the spindle and disposed to rotate therewith;

wherein a first foil disk has at least two slots at an inner diameter in the vicinity of the attachment of the first foil disk to the spindle;

wherein at least one slot in the first foil disk has a radial width and extends outwards from the inner diameter;

wherein the second foil disk has at least two slots at an inner diameter in the vicinity of the attachment of the second foil disk to the spindle;

wherein at least one slot in the second foil disk has a radial width and extends outwards from the inner diameter;

and wherein at least one of the said slots in the first foil disk is arranged such that it is not aligned with any of the said slots in the second foil disk;

wherein certain foil disk substrate parameters are determined from a range parameter defined by $$\text{RANGE} = \frac{\rho R^2}{Et^2}$$

where $\rho$=foil disk substrate mass density,
R=foil disk substrate radius,
E=Young's modulus of foil disk substrate, and
t=foil disk substrate thickness;
wherein said RANGE has dimensional units of $s^2/in^2$;
and wherein in order to provide for improved control of disk flutter and disk out-of-flatness, the magnitude of RANGE is between $10^{-6}$ and $3(10^{-4})$.

23. A data storage device as in claim 22, wherein a first recording head slider is arranged on a first side of the first foil disk, and a second recording head slider is arranged on a second side of the first foil disk substantially opposing the first recording head slider.

24. A data storage device as in claim 23, wherein a third recording head slider is arranged on a first side of the second foil disk.

25. A data storage device as in claim 24, wherein a fourth recording head slider is arranged on a second side of the second foil disk substantially opposing the third recording head slider.

* * * * *